US008748510B2

(12) United States Patent
Inagaki (10) Patent No.: US 8,748,510 B2
(45) Date of Patent: Jun. 10, 2014

(54) FLAME-RETARDANT POLYCARBONATE RESIN COMPOSITION

(75) Inventor: Yasuhito Inagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 785 days.

(21) Appl. No.: 12/481,198

(22) Filed: Jun. 9, 2009

(65) Prior Publication Data

US 2009/0306275 A1 Dec. 10, 2009

(30) Foreign Application Priority Data

Jun. 10, 2008 (JP) ................................ 2008-152072

(51) Int. Cl.
*C08F 283/08* (2006.01)
*C08L 83/00* (2006.01)

(52) U.S. Cl.
USPC ........... 523/201; 524/165; 524/508; 525/146; 525/185

(58) Field of Classification Search
USPC ........ 523/201; 525/333.5, 185, 146; 252/609; 524/165, 508
See application file for complete search history.

(56) References Cited

U.S. PATENT DOCUMENTS

| 4,696,995 | A | * | 9/1987 | Peters | 528/206 |
| 4,764,562 | A | * | 8/1988 | Tojo et al. | 525/281 |
| 5,759,708 | A | * | 6/1998 | Tarasevich et al. | 428/689 |
| 6,417,319 | B1 | * | 7/2002 | Shibuya et al. | 528/196 |
| 2005/0159518 | A1 | * | 7/2005 | Miyamoto et al. | 524/155 |
| 2005/0261414 | A1 | * | 11/2005 | Mitsuhashi et al. | 524/451 |
| 2007/0181859 | A1 | | 8/2007 | Inagaki | |
| 2009/0215934 | A1 | * | 8/2009 | Nakamura et al. | 524/115 |
| 2011/0313110 | A1 | * | 12/2011 | Inagaki | 525/146 |
| 2013/0237668 | A1 | * | 9/2013 | Inagaki | 525/185 |

FOREIGN PATENT DOCUMENTS

| EP | 2 180 033 A1 | 4/2010 |
| JP | 2004-143410 | 5/2004 |
| JP | 2005-054085 | 3/2005 |
| JP | 2005-272538 A | 10/2005 |
| JP | 2007-063514 A | 1/2007 |
| WO | WO 02/059205 A1 | 8/2002 |

OTHER PUBLICATIONS

Machine Translation of JP 2007-063514.*

* cited by examiner

*Primary Examiner* — Hannah Pak
(74) *Attorney, Agent, or Firm* — Wolf, Greenfield & Sacks, P.C.

(57) ABSTRACT

Five to eighty-five percent by weight of an aromatic polycarbonate resin (A component) having a weight-average molecular weight (polystyrene equivalent) of 27000 to 35000, 0.2 to 10 percent by weight of an impact strength improver (D component), 0.05 to 4 percent by weight of a core-shell-type styrene-based polymer flame retardant (E component) having a sulfonate group bonded to a particle surface layer portion, 5 to 20 percent by weight of an inorganic filler (F component), and 0.1 to 0.5 percent by weight of a polyfluoroolefin resin (G component) are mixed.

17 Claims, 3 Drawing Sheets

FLAME-RETARDANT POLYCARBONATE RESIN COMPOSITION

BACKGROUND OF THE INVENTION

1. Field of the Invention

The present invention generally relates to resin compositions that contain polycarbonate resins having high flame retardancy and can be molded into thin products. In particular, the present invention relates to a flame retardant polycarbonate resin composition containing an environmentally friendly halogen-free flame retardant and a recycled polycarbonate resin recycled from discarded optical disks.

2. Description of the Related Art

Recently, in various fields including electrical and electronic appliances such as home electric and electronic appliances, office automation (OA) equipment, and information and communication appliances, products with mechanical strength are desired under the trends of weight and size reduction. There is also social need for environment-conscious products that do not use halogens. In this regard, plastics commonly used in products in the past such as polystyrene (PS) and acrylonitrile-butadiene-styrene (ABS) resins are being increasingly replaced by polycarbonate (PC) resins that exhibit high strength despite a small thickness. Under such trends, flame retardant PC resins rendered flame retardant by incorporation of phosphorus (phosphates and the like)-based flame retardants are increasingly used.

However, since flame retardant PC resins contain large amounts (several to some ten percent by weight) of phosphorus-based flame retardants, gas may be generated in the course of injection-molding the resin compositions, and the heat resistance, recyclability, and storage stability (in high temperature and high humidity) of the resin compositions may deteriorate significantly. These problems occur because phosphorus-based flame retardants are highly hydrolyzable or pyrolyzable and because the amounts added to the resins are large. To address these problems, Japanese Unexamined Patent Application Publication Nos. 2004-143410 and 2005-54085 propose fabrication of flame retardant PC resins by using a functional group-containing silicone and a combination the functional group-containing silicone and an organic alkali metal salt as the flame retardant (without using a phosphorus-based flame retardant). However, the methods described in the aforementioned documents rarely provide sufficient flame retardancy. The flame retardancy desired for electric home appliances and the like with a small thickness has not been achieved.

SUMMARY OF THE INVENTION

It is desirable to provide a non-boron, non-phosphorus-based flame retardant polycarbonate resin composition that generates less gas during molding, has excellent heat resistance, recyclability, and storage stability, and exhibits high flame retardancy despite a small thickness, in which boron-based or phosphorus-based flame retardants are not used.

The inventors have found on the basis of extensive studies that a composition containing particular amounts of an aromatic polycarbonate resin and an acrylonitrile-styrene-based rubber having particular molecular weights and particular amounts of an impact strength improver, a core-shell-type styrene-based polymer flame retardant containing a sulfonate group bonded to a surface layer portion, an inorganic filler, and a polyfluoroolefin resin exhibits high flame retardancy despite a small thickness and have made the present invention.

In particular, an embodiment of a flame retardant polycarbonate resin composition contains 5 to 85 percent by weight of an aromatic polycarbonate resin (A component) having a weight-average molecular weight (polystyrene equivalent) of 27000 to 35000, 0.2 to 10 percent by weight of an impact strength improver (D component), 0.05 to 4 percent by weight of a core-shell-type styrene-based polymer flame retardant (E component) having a sulfonate group bonded to a particle surface layer portion, 5 to 20 percent by weight of an inorganic filler (F component), and 0.1 to 0.5 percent by weight of a polyfluoroolefin resin (G component). The flame retardant polycarbonate resin composition may contain an aromatic polycarbonate resin having a weight-average molecular weight (polystyrene equivalent) of 40000 to 60000 and an acrylonitrile-styrene-based resin having a weight-average molecular weight (polystyrene equivalent) of 90000 to 140000.

The flame retardant polycarbonate resin composition described above containing particular amounts of an aromatic polycarbonate resin, an impact strength improver, a core-shell-type styrene-based polymer flame retardant, an inorganic filler, a polyfluoroolefin resin having particular molecular weights exhibits satisfactory flame retardancy, heat resistance, recyclability, and storage stability in high temperature and high humidity despite a small thickness. Moreover, since waste optical disks prepared for other purposes can be effectively used as the raw material, the composition contributes to resource saving for polycarbonate resins.

DESCRIPTION OF THE PREFERRED EMBODIMENTS

A flame retardant polycarbonate resin composition according to an embodiment of the present invention will now be described in detail with reference to the drawings.

The flame retardant polycarbonate resin composition at least contains an aromatic polycarbonate resin (A component) having a weight-average molecular weight (polystyrene equivalent) of 27000 to 35000, an impact strength improver (D component), a core-shell-type styrene-based polymer flame retardant (E component), an inorganic filler (F component), and a polyfluoroolefin resin (G component). The flame retardant polycarbonate resin composition may contain an aromatic polycarbonate resin (B component) having a weight-average molecular weight (polystyrene equivalent) of 40000 to 60000 and an acrylonitrile-styrene-based resin (C component) having a weight-average molecular weight (polystyrene equivalent) of 90000 to 140000, if necessary. This flame retardant polycarbonate resin composition is used to make electric and electrical appliances such as home electric and electronic appliances, office automation (OA) equipment, and information and communication appliances, and gives thin molded products exhibiting high flame retardancy and heat resistance, etc.

A Component

The aromatic polycarbonate resin (A component) has a weight-average molecular weight (polystyrene equivalent) of 27000 to 35000. The aromatic polycarbonate resin having a weight-average molecular weight (polystyrene equivalent) of 27000 to 35000 has a relatively low molecular weight to improve the moldability (flowability) of the flame retardant polycarbonate resin composition. Typically, such an aromatic polycarbonate resin is used in applications involving high fluidity and in fabricating optical disks. In general, an aromatic polycarbonate synthesized by reacting a dihydric phenol with a carbonate precursor is used as the aromatic polycarbonate resin. Examples of the reaction method include interfacial polymerization, a melting ester exchange method, a solid phase ester exchange method involving a carbonate prepolymer, and ring-opening polymerization of a cyclic carbonate compound. The dihydric phenol and the carbonate precursor are not particularly limited, and various types of dihydric phenols and carbonate precursors may be used.

The aromatic polycarbonate resins described above may be newly synthesized virgin materials. Alternatively, they may be waste materials or scraps produced during manufacturing processes or waste or recycled materials of optical disks (substrates) such as digital versatile disks (DVDs), compact disks (CDs), magneto-optical disks (MOs), minidisks (MD), blue-ray disks (BDs), and the like.

In the case where waste optical disks are used, such optical disks have various attached matters such as metal reflective layers, plating layers, recording material layers, adhesive layers, labels, and the like. These attached matters may be left as they are for use. Alternatively, such impurities and sub-materials may be separated and removed by a common procedure before use.

Specific examples of the matters attached to optical disks include metal reflective layers composed of Al, Au, Si, and the like; organic dyes including cyanine dyes; recording material layers composed of Te, Se, S, Ge, In, Sb, Fe, Tb, Co, Ag, Ce, and Bi; adhesive layers composed of at least one of an acryl-based acrylate, an ether-based acrylate, a vinyl-based monomer, oligomer, or polymer; and label ink layers containing at least one of UV-curable monomer, oligomer, and polymer, a polymerization initiator, a pigment, and an auxiliary agent. The attached matters are not limited to these and may include any film-forming material or coating material usually used in optical disks.

Note that from the viewpoint of recycling, the cost for materials is preferably low. Thus, it is preferable to reuse resins containing impurities derived from various materials without any processing. In recycling, optical disks are pulverized finely, and pulverized optical disks are kneaded and melted with or without particular additives and pelletized so that the resulting pellets can be used as the aromatic polycarbonate resin material. Alternatively, depending on the structure of an injection molding machine, the redeemed disks may be directly fed to hoppers or the like of injection molding machines along with various additives described below to obtain molded products composed of the resin composition.

Note that when an aromatic polycarbonate resin not containing various impurities described above is to be used, attached matters such as metal reflective layers, recording material layers, adhesive layers, surface hardening layers, and labels may be mechanically or chemically removed by the processes described in Japanese Unexamined Patent Application Publication Nos. 6-223416, 10-269634, and 10-249315, for example.

Japanese Unexamined Patent Application Publication No. 6-223416 describes a method for removing aluminum coating films from substrates of compact disks, for example. The method for removing the aluminum coating films includes the steps of immersing a disk in a heated alkaline solution while stirring the disk by ultrasonic energy until the coating films separate from the substrate, washing the polycarbonate disk from which the coating films are separated, and drying the polycarbonate disk.

Japanese Unexamined Patent Application Publication No. 10-269634 describes removal of recording layers from information recording media by, for example, chemical mechanical polishing.

Japanese Unexamined Patent Application Publication No. 10-249315 describes a method for recovering a dye layer from an optical disk, including bringing the optical disk into contact with an organic solvent that dissolves the dye layer to remove the dye layer from the substrate and recover the dye layer.

The weight-average molecular weight of the aromatic polycarbonate resin can be determined as a polystyrene equivalent by using a polystyrene molecular weight standard substance (sample) by gel permeation chromatography (GPC) using a chloroform solvent.

The aromatic polycarbonate resin has a weight-average molecular weight in the range of 27000 to 35000. Due to such a low molecular weight, the flowability during melting is satisfactory, and the workability of the end product, flame retardant polycarbonate resin composition can be improved.

Since the weight-average molecular weight of the aromatic polycarbonate resin is adjusted to 35000 or less, the flowability (workability) of the final product, flame retardant polycarbonate resin composition during melting can be improved. Since the weight-average molecular weight is 27000 or more, the solvent resistance does not decrease and generation of solvent cracks (cracks caused by chemicals) can be suppressed.

Although the weight-average molecular weight of the aromatic polycarbonate is in the range of 27000 to 35000, measurement results vary depending on the measurement conditions and environment of GPC. The weight-average molecular weight of the aromatic polycarbonate resin described herein permits a range of measurement errors, i.e., an error of about 10%.

The aromatic polycarbonate resin content in the flame retardant polycarbonate resin composition is typically 5 to 85 percent by weight and preferably 10 to 40 percent by weight. Since the aromatic polycarbonate resin content is 5 percent by weight or more, the flowability of the flame retardant polycarbonate (PC) resin composition does not deteriorate and a satisfactory molded product can be obtained. At an aromatic polycarbonate resin content of 85 percent by weight or less, the mechanical properties (impact strength or the like) and the solvent resistance of the flame retardant polycarbonate (PC) resin composition can be prevented from decreasing.

B Component

The aromatic polycarbonate resin (B component) having a weight-average molecular weight (polystyrene equivalent) of 40000 to 60000 has a higher molecular weight than the A component aromatic polycarbonate resin to improve the dynamic properties (impact strength, tensile yield strength, etc.) of the flame retardant polycarbonate resin composition. This aromatic polycarbonate resin (B component) is usually used in structural materials (e.g., molded products and film products). As in the case of the A component aromatic carbonate resin, an aromatic polycarbonate synthesized by reacting a dihydric phenol with a carbonate precursor may be used as the B component aromatic polycarbonate resin. Examples of the reactions are also the same. In this case also, the dihydric phenol and the carbonate precursor are not particularly limited, and various types of dihydric phenols and carbonate precursors may be used.

The molecular weights of the A component aromatic polycarbonate resin and the B component aromatic polycarbonate resin can be controlled by adjusting the type and amount of the dihydric phenol and the carbonate precursor, reaction temperature, reaction time, concentration, pressure, and type and amount of the catalyst.

The B component aromatic polycarbonate resin described above may be a newly synthesized virgin material. Alternatively, it may be a waste material or scrap produced during manufacturing processes or a waste or recycled material from products (e.g., bottles, sheets, and structural materials such as various molded products). Typically, the weight-average molecular weight (polystyrene equivalent) of the aromatic polycarbonate resins used in optical films and water bottles is 40000 to 60000. The aromatic polycarbonate resins obtained by recycling the optical films and water bottles are suitable for use as the B component aromatic polycarbonate resin.

The B component aromatic polycarbonate resin described above has a high molecular weight and thus exhibits excellent dynamic properties. The B component aromatic polycarbonate resin contributes to improving the impact strength and tensile yield strength of the end product, flame retardant polycarbonate (PC) resin composition. The solvent resistance can also be improved.

The weight-average molecular weight of the B component aromatic polycarbonate resin is in the range of 40000 to 60000. Since the weight-average molecular weight is 60000 or less, the flowability (workability) of the end product, flame retardant polycarbonate resin composition during melting can be improved. Since the weight-average molecular weight is 40000 or more, the dynamic properties such as impact strength and tensile yield strength can be improved.

Although the weight-average molecular weight of the aromatic polycarbonate resin is in the range of 40000 to 60000, measurement results vary depending on the measurement conditions and environment of GPC. The weight-average molecular weight of the aromatic polycarbonate resin described herein permits a range of measurement errors, i.e., an error of about 10%.

The B component aromatic polycarbonate resin content in the flame retardant polycarbonate (PC) resin composition is typically 30 to 84 percent by weight, preferably 30 to 63 percent by weight, and more preferably 39 to 57 percent by weight. Since the B component aromatic polycarbonate resin content is 84 percent by weight or less, the flowability (workability) of the flame retardant polycarbonate (PC) resin composition can be improved.

The B component aromatic polycarbonate resin is added if necessary to further improve the dynamic strength and the like.

C Component

The acrylonitrile-styrene-based resin (C component) having a weight-average molecular weight (polystyrene equivalent) of 90000 to 140000 improves oil resistance, solvent resistance, and flowability of the flame retardant polycarbonate resin composition. Since the weight-average molecular weight (polystyrene equivalent) of the acrylonitrile-styrene-based resin is 90000 or more, the oil resistance and solvent resistance of the flame retardant polycarbonate (PC) resin composition can be improved without degrading the dynamic properties (e.g., impact strength or the like). Since the weight-average molecular weight is 140000 or less, the flowability can be improved.

Although the weight-average molecular weight of the acrylonitrile-styrene-based resin is in the range of 90000 to 140000, measurement results vary depending on the measurement conditions and environment of GPC. The weight-average molecular weight of the acrylonitrile-styrene-based resin described herein permits a range of measurement errors, i.e., an error of about 10%.

optionally, the melt flow rate (MFR: 200° C., 5 Kg) of the C component acrylonitrile-styrene-based resin is less than 15 preferably less than 10, and more preferably less than 5. The melt flow rate and the weight-average molecular weight are substantially linked with each other. As the melt flow rate increases, the weight-average molecular weight decreases. Thus, at a high melt flow rate, improvements in oil resistance and solvent resistance of the flame retardant polycarbonate (PC) resin composition are rarely achieved, and dynamic properties (impact strength and the like) are also degraded.

The acrylonitrile content in the acrylonitrile-styrene-based resin is 15 to 50 percent by weight and preferably 20 to 45 percent by weight. When the acrylonitrile content is 15 percent by weight or more and 50 percent by weight or less, the compatibility between the A component and B component aromatic polycarbonate resins and the acrylonitrile-styrene-based resin improves, and the risk of inflicting undesirable phenomena such as delamination can be prevented from increasing.

The acrylonitrile-styrene-based resin content in the flame retardant polycarbonate resin composition is typically 0 to 15 percent by weight and preferably 5 to 15 percent by weight. When the acrylonitrile-styrene-based resin content is 15 percent by weight or less, advantageous effects can be achieved without degrading the flame retardancy or dynamic properties (impact strength etc.) of the flame retardant polycarbonate resin composition.

The C component acrylonitrile-styrene-based resin is an optional component added to improve the oil resistance, solvent resistance, and flowability when desired.

D Component

The impact strength improver is used to improve the impact strength of the flame retardant polycarbonate resin composition. Materials used for resin modification (rubber-like elastic materials, thermoplastic elastomers, compatibilizers, and the like) are usually used as the impact strength improver.

Examples of the impact strength improver include rubber-like elastic materials such as acrylonitrile-butadiene-styrene (ABS), high-impact polystyrene (HIPS), styrene-butadiene rubber (SBR), methyl methacrylate-styrene resin, methyl methacrylate-butadiene-styrene (MBS) resin, isoprene-styrene rubber, isoprene rubber, polybutadiene (PB), butadiene-acryl rubber, isoprene-acryl rubber, and ethylene-propylene rubber; and thermoplastic elastomers such as styrene-based elastomers (SBC), vinyl chloride-based elastomers (TPVC), olefin-based elastomers (TPO), urethane-based elastomers (PU), polyester-based elastomers (TPEE), nitrile-based elastomers, polyamide-based elastomers (TPAE), fluorine-based elastomers, polyethylene chloride-based elastomers (CPE), syndiotactic 1,2-polybutadiene, trans-1,4-isoprene, silicone-based elastomers, ethylene chloride copolymer cross-linked alloys, and ester halogen-based polymer alloys. Other examples include styrene-ethylene-butadiene styrene copolymers (SEBS: hydrogenated styrene-based thermoplastic elastomer), styrene-ethylene-propylene-styrene copolymers (SEPS: hydrogenated styrene-based thermoplastic elastomer), styrene-butadiene-styrene copolymers (SBS), styrene-hydrogenated butadiene-styrene copolymers, styrene-isoprene-styrene block copolymers (SIS), styrene-vinyl oxazoline copolymers, a polycarbonate obtained by grafting a styrene-based elastomer such as epoxidized styrene-based elastomer with an acrylonitrile-butadiene polymer, petroleum resin obtained by polymerization of C5-C9 fractions, a material surface-modified with rubber microparticle polymer, and a core-shell-type impact strength improver having a graft layer outside particle-shaped rubber in which the rubber component is one or combination of a butadiene-based rubber, an acryl-based rubber, and a silicone-acryl composite rubber and the like.

Among these impact strength improvers, acrylonitrile-butadiene-styrene (ABS), high-impact polystyrene (HIPS), and styrene thermoplastic elastomers are preferred. Examples of the styrene thermoplastic elastomers include styrene-ethylene-butadiene-styrene copolymers (SEBS: hydrogenated styrene-based thermoplastic elastomers), styrene-ethylene-propylene-styrene copolymers (SEPS: hydrogenated styrene-based thermoplastic elastomers), styrene-butadiene-styrene copolymers (SBS), styrene-hydrogenated butadiene-styrene copolymers, styrene-isoprene-styrene block copolymers (SIS), styrene-vinyl oxazoline copolymers, and epoxidized styrene elastomers. Of these, styrene-ethylene-butadiene-styrene copolymers (SEBS: hydrogenated styrene-based thermoplastic elastomers) are most preferable. The impact strength improvers described above may be used alone or in combination.

The impact strength improvers alone have an effect of improving the toughness and elongation of the polycarbonate (PC) resins. In a mixed system involving a polycarbonate (PC) resin and an acrylonitrile-styrene (AS) resin, the impact strength improvers are compatible with both resins or improve the compatibility by being reacted partly so as to improve the dynamic characteristics and formability of the mixed resin.

The impact strength improver (D component) content in the flame retardant polycarbonate resin composition is typically 0.2 to 10 percent by weight, preferably 0.5 to 7.5 percent by weight, and more preferably 1 to 4 percent by weight. Since the impact strength improver content is 0.2 percent by weight or more, the effect of improving the impact strength of the flame retardant polycarbonate resin composition is increased. Since the impact strength improver content is 10 percent by weight or less, the flowability of the flame retardant polycarbonate resin composition can be improved.

E Component

The core-shell-type styrene-based polymer flame retardant having a sulfonate group bonded to a particle surface layer portion is used to impart flame retardancy to the flame retardant polycarbonate resin composition and preferably has a particular chemical composition or structure. That is, the core-shell-type styrene-based polymer flame retardant preferably contains a styrene-based polymer having a weight-average molecular weight (polystyrene equivalent) of 90000 to 300000 and a sulfonate group bonded to the styrene-based polymer, the amount the sulfonate group being 0.5 to 3.5 percent by weight on a sulfur basis.

Figure 1:
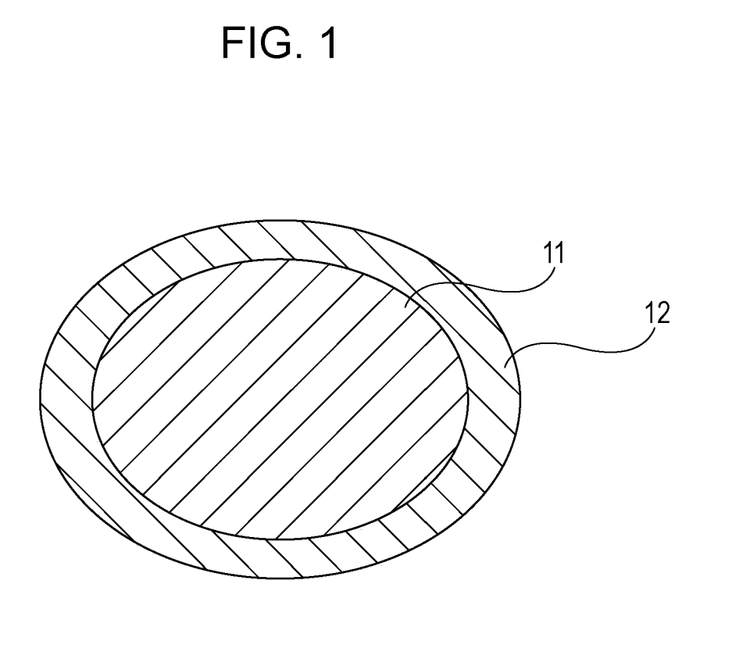
FIG. 1 is a cross-sectional view of a core-shell-type styrene-based polymer flame retardant contained in a flame retardant polycarbonate resin composition according to one embodiment.

As shown in FIG. 1, the core-shell-type styrene-based polymer flame retardant has a particle-shaped inner layer 11 and a particle surface layer portion 12 outside the inner layer 11. The inner layer 11 is composed of a polystyrene or a copolymer of styrene and a monomer other than styrene.

Examples of the monomer other than styrene include acrylonitrile, α-methylstyrene, butadiene, isoprene, pentadiene, cyclopentadiene, ethylene, propylene, butene, isobutylene, vinyl chloride, vinyltoluene, vinylnaphthalene, acrylic acid, acrylic acid esters, methacrylic acid, methacrylic acid esters, maleic acid, fumaric acid, ethylene glycol, phthalic anhydride, N-phenylmaleimide, and the like. These can be used alone or in combination. Among these, acrylonitrile, α-methylstyrene, and butadiene are more preferred, and acrylonitrile is particularly preferred. The content of the monomer other than styrene in the styrene-based polymer is in the range of 0 to 60 percent by weight and preferably in the range of 20 to 50 percent by weight.

Since the content of the monomer other than styrene in the styrene-based polymer is 60 percent by weight or less, introduction of the sulfonate group into the polymer is facilitated and a flame retardant effect can be achieved. In view of the above, a core-shell-type styrene-based polymer flame retardant prepared by allowing a sulfonate group to bond to a styrene-acrylonitrile copolymer having an acrylonitrile content of 20 to 50 percent by weight under particular conditions is preferred.

The styrene-based polymer in the core-shell-type styrene-based polymer flame retardant preferably has a weight-average molecular weight (polystyrene equivalent) of 90000 to 300000. When the weight-average molecular weight (polystyrene equivalent) of the styrene-based polymer is 90000 or more, the heat resistance and solvent resistance of the flame retardant polycarbonate resin composition are improved. When the weight-average molecular weight (polystyrene equivalent) is 300000 or less, the compatibility with the A component and B component aromatic polycarbonate resins improves, and uniform flame retardancy can be achieved.

The weight-average molecular weight of the styrene-based polymer can be determined as a polystyrene equivalent by using a polystyrene molecular weight standard substance (sample) by gel permeation chromatography (GPC) using a chloroform solvent.

Although the weight-average molecular weight of the styrene-based polymer is in the range of 90000 to 300000, measurement results vary depending on the measurement conditions and environment of GPC. The weight-average molecular weight of the styrene-based polymer described herein permits a range of measurement errors, i.e., an error of about 10%.

The particle surface layer portion 12 formed in the surface layer portion of the flame retardant is composed of a styrene-based polymer bonded with at least one of a sulfonic acid group ($-SO_3H$) and a sulfonate group (hereinafter referred to as "sulfonic acid group or the like") as the flame retarding factor. The styrene-based polymer is composed of the same styrene-based polymer constituting the inner layer 11. In other words, the particle surface layer portion 12 is formed by allowing the sulfonic acid group or the like to bond to the styrene-based polymer constituting the surface layer portion.

The particle surface layer portion 12 may be formed to completely cover the inner layer 11 or on part of the outer side of the inner layer 11. The particle surface layer portion 12 may be formed as a layer.

In the core-shell-type styrene-based polymer flame retardant, the particle surface layer portion 12 is disposed on the inner layer 11 of the flame retardant only and not inside the inner layer 11. Thus, when the flame retardant is exposed to a high-humidity environment, moisture does not easily penetrate the interior, water absorption is suppressed, the flame retardant particles do not easily stick to one another, and blocking can be suppressed. Thus, when this flame retardant is incorporated in the resin composition, the handling property and dispersibility improve. The compatibility also improves. Thus, the flame retardancy of the resin composition can be improved by adding a small amount of the flame retardant, and the long-term stability of physical properties such as flame retardancy and mechanical strength can be ensured.

In the case where the sulfonic acid group or the like is bonded to the interior of the inner layer 11, the hygroscopicity increases and water is absorbed in a high-humidity environment. As a result, the aromatic polycarbonate may be deteriorated or become highly soluble in a solvent, thereby causing roughness in the surface of the resin composition.

The sulfonic acid group or the like is a flame retarding factor that adequately imparts flame retardancy. The sulfonic acid group or the like may be uniformly or non-uniformly bonded to the high-molecular-weight polymer.

One example of the method for introducing a sulfonate group into the styrene-based polymer particle surface is to directly inject styrene-based polymer particles into a sulfonating agent and allowing the styrene-based polymer particles to react with the agent. Another example involves adding a sulfonating agent in liquid or gas form to styrene-based polymer particles dispersed (not dissolved) in an organic solvent. Alternatively, $SO_3$ gas may be directly sprayed onto the styrene-based polymer particles to conduct reaction. Among these methods, a method of directly spraying $SO_3$ gas to allow the gas to directly react with the styrene-based polymer is preferred. In particular, this method is also preferred since no organic solvent is used, which promotes environmental protection and cost reduction.

The sulfonated styrene-based polymer is preferably obtained by introducing a sulfonic acid metal salt or a sulfonic acid salt neutralized with ammonia or an amine compound. Specific examples of the sulfonic acid salt include sulfonic acid metal salts such as Na salts, K salts, Li salts, Os salts, Ca salts, Mg salts, Al salts, Zn salts, Sb salts, Sn salts, and Fe salts of sultonic acid; sulfonic acid ammonium salts; and sultonic acid alkylamine salts. Among these, Na salts, K salts, Li salts, and Os salts of sulfonic acid are preferred.

The amount of the sulfonate group to be introduced to the styrene-based polymer is preferably 0.5 to 3.5 percent by weight on a sulfur basis. Since the sulfur content in the flame retardant is 0.5 percent by weight or more, the flame retarding effect for the aromatic polycarbonate resin can be achieved. Since the sulfur content is 3.5 percent by weight or less, the styrene-based polymer shows good compatibility with the polycarbonate resins. Thus, the mechanical strength of the polycarbonate resin is prevented from deteriorating with time. Since the sulfur content is not excessively high, the polycarbonate resin is prevented from burning. The sulfur (S) content in the flame retardant can be determined by a flask combustion method, for example. Alternatively, the sulfonic acid group or the like may be converted into a salt with a metal ion and the quantity of the metal ion may be determined to determine the sulfur content in the flame retardant.

In a core-shell-type styrene-based polymer flame retardant having a sulfonate group bonded to the particle surface layer portion, the particle surface layer portion 12 composed of the sulfonate group bonded to the particle surface layer portion has a thickness of ½ or less, preferably ⅕ or less, and more preferably ¹/₁₀ or less of the diameter of the flame retardant particle. In the case where the thickness of the layer of the sulfonate groups bonded to the particle surface layer portion 12 is larger than this, the water absorbing property of the flame retardant for resin increases. This causes blocking between particles and degradation of mechanical properties, stability with time (in particular under high temperature and high humidity), and recyclability of the flame retardant polycarbonate resin composition containing this flame retardant for resin.

The thickness of the layer of the sulfonate group bonded to the particle surface layer portion 12 of the flame retardant can be easily determined by studying the particle cross-sections of the flame retardant by time-of-flight-secondary ion mass spectrometry (TOF-SIMS), for example.

Figure 2:
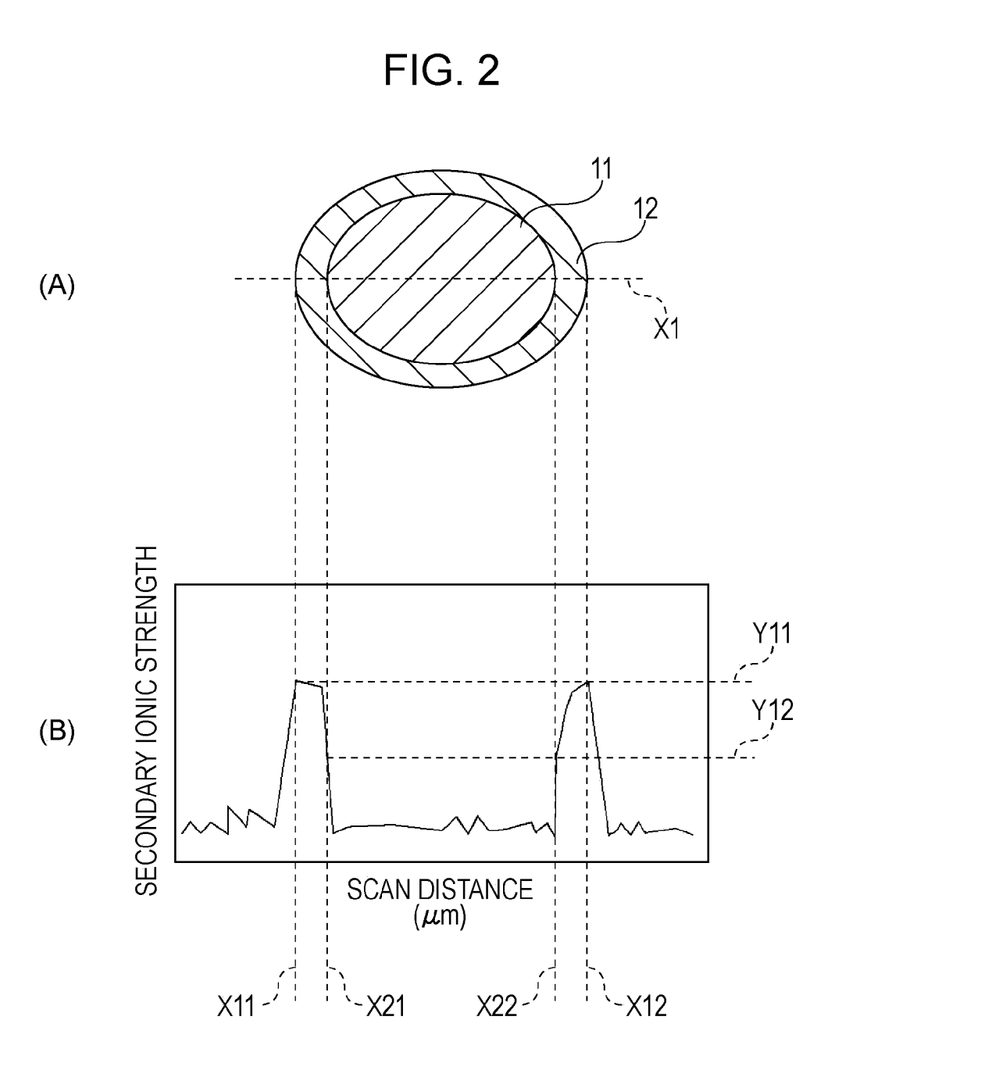
FIG. 2 is a schematic diagram showing the relationship between the cross-sectional structure of the core-shell-type styrene-based polymer flame retardant shown in FIG. 1 and the secondary ionic strength distribution, in which part (A) shows the cross-sectional structure of the core-shell-type styrene-based polymer flame retardant and part (B) shows the secondary ionic strength distribution.

The "ratio of the thickness of the particle surface layer (flame-retarding factor) portion 12" will now be described with reference to FIG. 2 by taking an example of measurement by TOF-SIMS. Part (A) of FIG. 2 is a schematic cross-sectional view taken substantially at the center of the flame retardant. Part (B) of FIG. 2 schematically shows the distribution of the secondary ionic strength of sulfur when measured along dotted line X1 of part (A). The horizontal axis indicates the scan distance (μm) and the vertical axis indicates the secondary ionic strength. When the secondary ionic strength of sulfur is measured while scanning the section of the flame retardant along dotted line X1 in part (A) of FIG. 2 by TOF-SIMS, two sharp peaks associated with sulfur of the sulfonic acid groups at the particle surface layer portion 12 are detected. In this case, the positions of the outer periphery of the flame retardant are assumed to be scan distances X11 and X12 at the maximum value Y11 of the secondary ionic strength of the two peaks. The particle diameter (μm) of the flame retardant is calculated on the basis of the difference between X11 and X12 (scan distance X12–scan distance X11). The positions of the interface between the particle surface layer portion 12 and the inner layer 11 are assumed to be scan distances X21 and X22 that lie between the scan distances X11 and X12. The scan distances X21 and X22 are the values at Y12, which is 50% of the maximum value Y11. The diameter (μm) of the inner layer 11 is calculated on the basis of the difference between the scan distances X21 and X22 (scan distance X22–scan distance X21). The ratio (%) of thickness of the particle surface layer portion 12, i.e., [(diameter of flame retardant particle–diameter of inner layer 11)/diameter of flame retardant particle]×100, is calculated on the basis of the diameter of the particle of the flame retardant and the diameter of the inner layer 11.

Naturally, the ratio of the thickness of the particle surface layer portion 12 can be calculated by any other method instead of the measurement or calculation method described above.

Figure 3:
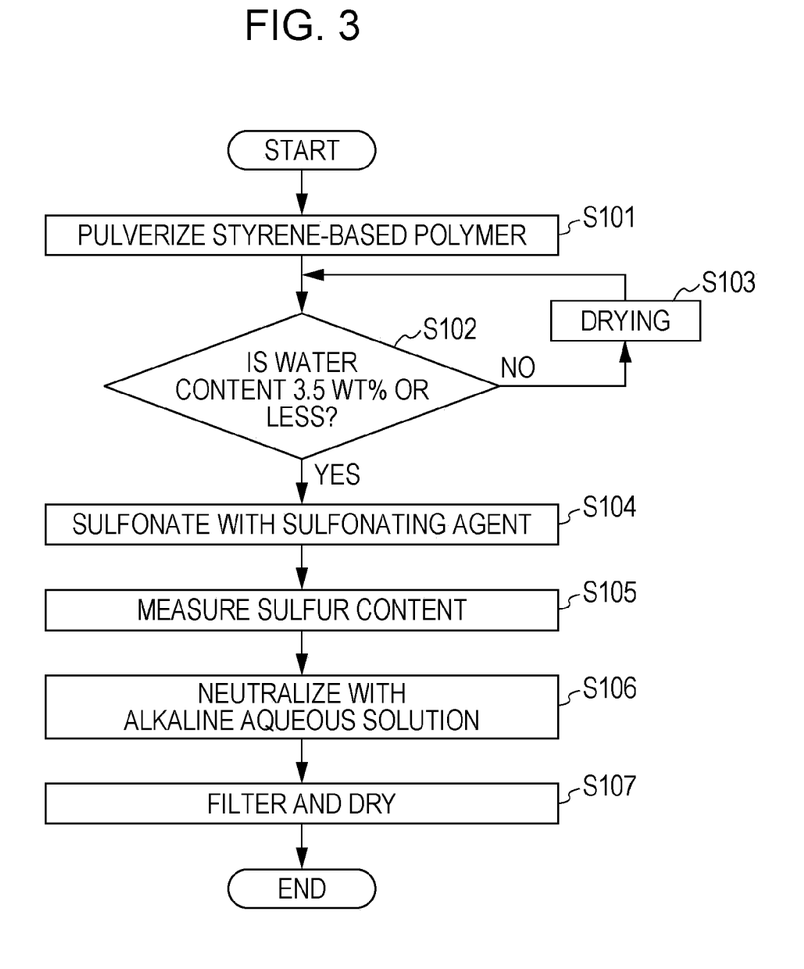
FIG. 3 is a flowchart of a method for making the core-shell-type styrene-based polymer flame retardant.

The method for making the core-shell-type styrene-based polymer flame retardant is as follows. Referring to FIG. 3, first, in step S101, a styrene-based polymer is pulverized into particles.

A frost-shattering method using liquid nitrogen is one example of method for pulverizing a high-molecular-weight polymer. The pulverized high-molecular-weight polymer preferably contains 30 percent by weight or more of particles or 60 mesh (250 μm) or less and 10 percent by weight or more of particles of 80 mesh (180 μm) or less. This is because the sulfonic acid group or the like can be smoothly introduced during sulfonation. To be more specific, when the particle diameter is 60 mesh or more, the surface area of the particle becomes small and the amount of sulfonic acid group or the like to be introduced during sulfonation decreases. Moreover, when the flame retardant is mixed with the resin composition, the flame retardant may not disperse uniformly and sufficient flame retardancy may not be achieved. In contrast, when the particle diameter is small, no problem arises during sulfonation. However, since the diameter of the flame retardant particles is small, anti-dust measures are desirable depending on the need. In particular, 50 percent by weight or more of particles of 60 mesh or less and 30 percent by weight or more of particles of 80 mesh or less are preferably contained. In particular, 70 percent by weight or more of particles of 60 mesh or less and 50 percent by weight or more of particles of 80 mesh or less are more preferably contained. This is because a higher effect can be achieved.

If a styrene-based polymer in particle form is available, pulverization is not performed. In such a case, in producing a high-molecular-weight polymer from monomers by any of various polymerization processes (e.g., suspension polymerization, mass polymerization, pearl polymerization, etc.), conditions of the polymerization may be adjusted to form particles of a desired diameter.

In step S102, whether the water content in the pulverized high-molecular-weight polymer is 3.5 percent by weight or less is checked. If the water content exceeds 3.5 percent by weight (No in step S102), the pulverized high-molecular-weight polymer is dried in step S103 and then the water content is checked again. The reason for adjusting the water content in the pulverized high-molecular-weight polymer to 3.5 percent by weight or less is because at such a water content, the sulfonic acid group or the like can be satisfactorily and stably introduced into the resin by sulfonation. To be more specific, at a water content exceeding 3.5 percent by weight, moisture adheres on the surface of the high-molecular-weight polymer in particle form and water coating films are thereby formed. When this occurs, the sulfonating agent used for sulfonation reacts with water first and reaction between the sulfonating agent and the high-molecular-weight polymer is suppressed, thereby rendering it difficult to introduce the sulfonic acid group or the like. As a result, the degree to which sulfonation is conducted varies between the particles of the high-molecular-weight polymer and an aromatic polycarbonate resin composition containing such a flame retardant may not achieve sufficient flame retardancy. In particular, the water content is preferably 2 percent by weight or less and more preferably 1 percent by weight or less to achieve significant effects.

Next, in step S104, the high-molecular-weight polymer in particle form is sulfonated with a sulfonating agent if the water content of the pulverized high-molecular-weight polymer is 3.5 percent by weight or less (Yes in step S102). As a result, the particle surface layer portion 12 is formed on the surface layer portion of the high-molecular-weight polymer in particle form.

Examples of the sulfonating agent include sulfuric anhydride, fuming sulfuric acid, chlorosulphonic acid, concentrated sulfuric acid, and polyalkylbenzene sulfonates. These may be used alone or in combination. Complexes with Lewis bases such as an alkyl phosphoric acid ester or dioxane may be used as the sulfonating agent.

In the case where the high-molecular-weight polymer has a readily hydrolyzable substituent such as a cyano group, moisture in the sulfonating agent causes hydrolysis (side reaction) separate from the sulfonation (main reaction). This accelerates hydrolysis of the substituent such as a cyano group. In other words, as a result of suppression of the sulfonation, the amount of the sulfonic acid group or the like introduced decreases. Thus, the sulfonating agent preferably has a moisture content as low as possible. For example, sulfuric anhydride, fuming sulfuric acid, chlorosulphonic acid, concentrated sulfuric acid, and polyalkylbenzene sulfonates are preferred. The moisture content in the sulfonating agent is, for example, 3 percent by weight or less and preferably 1 percent by weight or less.

As for the sulfonation method, any method that can make the high-molecular-weight polymer in particle form react with the sulfonating agent may be used. For example, the following first to third methods are available. According to a first method, for example, a high-molecular-weight polymer in particle form is dispersed in an organic solvent and sulfonated by adding a particular amount of sulfonating agent (in liquid or gas form, for example). According to a second method, a high-molecular-weight polymer in particle form is directly injected into a sulfonating agent to conduct sulfonation. According to a third method, for example, sulfonating gas (e.g., sulfur trioxide $SO_3$ gas) is directly sprayed toward a high-molecular-weight polymer in particle form to conduct sulfonation. Among these, the first or third method is preferred. In particular, the third method is more preferable since no organic solvent is used, which promotes environmental protection and cost reduction.

Next, in step S105, the sulfur content is measured to check whether sulfonation has been conducted properly or whether a target amount of the sulfonic acid group or the like has been introduced. In this step, the sulfur content may or may not be determined. In the case where the sulfur content is not determined in this step, the sulfur content may be determined after completion of preparation of the flame retardant. Then in step S106, the high-molecular-weight polymer with the particle surface layer portion 12 is neutralized with an alkaline aqueous solution. As a result, the sulfonating agent is neutralized, and the sulfonation reaction is terminated.

Lastly, in step S107, filtration is conducted to separate the neutralizing solution and the residue is dried. As a result, the core-shell-type styrene-based polymer flame retardant described above is obtained.

When the core-shell-type styrene-based polymer flame retardant prepared as such is exposed to temperature elevation similar to being brought close to flame, the core-shell-type styrene-based polymer flame retardant generates radicals as the bonds between the styrene-based polymer and the sulfonic acid or sulfonate group become cleaved. As a result, the aromatic polycarbonate resin composition containing such a flame retardant becomes less combustible.

The amount of the core-shell-type styrene-based polymer flame retardant with a sulfonate group bonded to the particle surface layer portion 12 on the particle surface layer described above is preferably 0.05 to 4 percent by weight and more preferably 0.2 to 1 percent by weight relative to the amount of the A component aromatic polycarbonate resin or the total of the A component aromatic polycarbonate resin and the B component aromatic polycarbonate resin. Since the flame retardant content is 0.05 percent by weight or more and 4 percent by weight or less, the flame retarding effect for the polycarbonate resin composition can be expected.

The core-shell-type styrene-based polymer flame retardant (E component) may be used in combination with another flame retardant. Examples of the other flame retardant include organic phosphoric acid ester flame retardants, halogenated phosphoric acid ester flame retardants, inorganic phosphorus-based flame retardants, halogenated bisphenol-based flame retardants, other halogenated compounds, antimony-based flame retardants, nitrogen-based flame retardants, boron-based flame retardants, metal salt-based flame retardants, inorganic flame retardants, and silicon-based flame retardants. These may be used alone or in combination.

Specific examples of the organic phosphoric acid ester flame retardants include triphenyl phosphate, methylneobenzyl phosphate, pentaerythritol diethyl diphosphate, methylneopentyl phosphate, phenylneopentyl phosphate, pentaerythritol diphenyl diphosphate, dicyclopentyl hypodiphosphate, dineopentyl hypophosphite, phenylpyrocatechol phosphite, ethylpyrocatechol phosphate, and dipyrocatechol hypodiphosphate. These may be used alone or in combination as a mixture.

Examples of the halogenated phosphoric acid ester flame retardants include tris(β-chloroethyl)phosphate, tris(dichloropropyl)phosphate, tris(β-bromoethyl)phosphate, tris(dibromopropyl)phosphate, tris(chloropropyl)phosphate, tris(dibromophenyl)phosphate, tris(tribromophenyl)phosphate, tris(tribromoneopentyl)phosphate, condensed polyphosphate, and condensed polyphosphonate. These may be used alone or in combination.

Examples of the inorganic phosphorus-based flame retardants include red phosphorus and inorganic phosphates. These may be used alone or in combination.

Examples of the halogenated bisphenol-based flame retardants include tetrabromobisphenol A, oligomers thereof, and bis(bromoethylether) tetrabromobisphenol A. These may be used alone or in combination.

Examples of other halogen compounds include decabromodiphenyl ether, hexabromobenzene, hexabromocyclododecane, tetrabromo phthalic anhydride, (tetrabromobiphenol)epoxy oligomer, hexabromobiphenyl ether, tribromophenol, dibromocresyl glycidyl ether, decabromodiphenyl oxide, halogenated polycarbonate, halogenated polycarbonate copolymers, halogenated polystyrene, halogenated polyolefin, chlorinated paraffin, and perchlorocyclodecane. These may be used alone or in combination.

Examples of the antimony-based flame retardant include antimony trioxide, antimony tetroxide, antimony pentoxide and sodium antimonate. These may be used alone or in combination.

Examples of the nitrogen-based flame retardants include melamine, alkyl- or aromatic-substituted melamine, melamine cyanurate, melamine isocyanurate, melamine phosphate, triazine, guanidine compounds, urea, various cyanuric acid derivatives, and phosphazene compounds. These may be used alone or in combination.

Examples of the boron-based flame retardant include zinc borate, zinc metaborate, and barium metaborate. These may be used alone or in combination.

Examples of the metal salt-based flame retardants include alkali metal salts and alkali earth metal salts of perfluoroalkane sulfonic acid, alkylbenzene sulfonic acid, halogenated alkylbenzene sulfonic acid, alkylsulfonic acid, and naphthalene sulfonic acid. These may be used alone or in combination.

Examples of the inorganic flame retardants include magnesium hydroxide, aluminum hydroxide, barium hydroxide, calcium hydroxide, dolomite, hydrotalcite, basic magnesium carbonate, hydrogenated zirconium, hydrates of inorganic metal compounds such as hydrates of tin oxide, metal oxides such as aluminum oxide, iron oxide, titanium oxide, manganese oxide, magnesium oxide, zirconium oxide, zinc oxide, molybdenum oxide, cobalt oxide, bismuth oxide, chromium oxide, tin oxide, nickel oxide, copper oxide, and tungsten oxide, powders of metals such as aluminum, iron, copper, nickel, titanium, manganese, tin, zinc, molybdenum, cobalt, bismuth, chromium, tungsten, and antimony, and carbonates such as zinc carbonate, magnesium carbonate, calcium carbonate, and barium carbonate. These may be used alone or in combination.

Examples of the silicon-based flame retardants include polyorganosiloxane resins (silicone, organic silicates, etc.) and silica. These may be used alone or in combination. Examples of the polyorganosiloxane resins include polymethylethyl siloxane resins, polydimethyl siloxane resins, polymethylphenyl siloxane resins, polydiphenyl siloxane resins, polydiethyl siloxane resins, polyethylphenyl siloxane resins, and mixtures thereof. The alkyl moiety of these polyorganosiloxane resins may contain a functional group such as alkyl, alkoxy, hydroxyl, amino, carboxyl, silanol, mercapto, epoxy, vinyl, aryloxy, polyoxy alkylene, hydrogen, or a halogen. In particular, the alkyl moiety preferably contains alkyl, alkoxyl, hydroxyl, vinyl, or the like.

The average molecular weight of the polyorganosiloxane resin is 100 or more and preferably in the range of 500 to 5000000. The form of the polyorganosiloxane resin may be oil, varnish, gum, powder, or pellets. Silica is preferably surface-treated with a silane coupling agent of a hydrocarbon-based compound.

The amounts of the above-described existing flame retardants to be contained differ depending on the type of the flame retardant, the level of flame retardancy desired, and the type of resin rendered flame retardant. The flame retardant content is usually in the range of 0 to 50 percent by weight, preferably in the range of 0 to 30 percent by weight, and more preferably in the range of 0 to 10 percent by weight relative to the amount of the polycarbonate resin.

F Component

The inorganic filer is used to enhance dynamic strength of the flame retardant polycarbonate resin composition and to further improve the flame retardancy.

Examples of the inorganic filler include crystalline silica, fused silica, alumina, magnesia, talc, mica, kaolin, clay, diatomaceous earth, calcium silicate, titanium oxide, glass fibers, calcium fluoride, calcium phosphate, barium phosphate, calcium phosphate, carbon fibers, carbon nano-tubes, and potassium titanate fibers. These may be used alone or in combination. Among these, talc, mica, carbon, and glass are preferably used, and talk is more preferably used.

In the case where the inorganic filler is added, the amount of the inorganic filler is 5 to 20 percent by weight and preferably 10 to 15 percent by weight relative to the amount of the flame retardant polycarbonate resin composition. Since the inorganic filler content is 5 percent by weight or more, the rigidity and flame retardancy of the flame retardant polycarbonate resin composition can be improved. Since the inorganic filler content is 20 percent by weight or less, the decrease in flowability of the resin composition melted during injection molding and the decrease in mechanical strength can be prevented.

G Component

The polyfluoroolefin resin is used to suppress a dripping phenomenon that occurs during combustion of the flame retardant polycarbonate resin composition.

Specific examples of the polyfluoroolefin resins include difluoroethylene polymers, tetrafluoroethylene polymers, tetrafluoroethylene-hexafluoropropylene copolymers, and copolymers of tetrafluoroethylene and ethylene-based monomers. These may be used alone or in combination. Among these, tetrafluoroethylene polymers are preferred. The average molecular weight is preferably 50000 or more and more preferably 100000 or more and 20000000 or less.

The polyfluoroolefin resin preferably has a fibril-forming property. The polyfluoroolefin resin content in the flame retardant polycarbonate resin composition is preferably 0.1 to 0.5 percent by weight. Since the polyfluoroolefin resin content is 0.1 percent by weight or more, the dripping phenomenon can be suppressed. Since the polyfluoroolefin resin content is 0.5 percent by weight or less, a maximum degree of dripping-suppressing effects can be obtained without increasing the cost or decreasing the mechanical strength or the resin flowability.

The flame retardant polycarbonate resin composition may further contain, in addition to the additives described above, other additives such as an anti-oxidant (hindered phenol-based, phosphorus-based, or sulfur-based anti-oxidant), an anti-static agent, a UV absorber (benzophenone-based, benzotriazole-based, hydroxyphenyltriazine-based, cyclic iminoester-based, or cyanoacrylate-based UV absorber), a light stabilizer, a plasticizer, a compatibilizer, a coloring agent (pigment or dye), a light-scattering agent, a crystal nucleating agent, a bactericidal agent, a flow improver, an infrared absorber, a phosphor, an anti-hydrolysis agent, a releasing agent, and a surface-treating agent. These additives improve injection moldability, impact strength, appearance, heat resistance, weatherability, color, rigidity, etc.

The flame retardant polycarbonate resin composition described above can be produced by the following process, for example. Particular amounts of the A component aromatic polycarbonate, the D component impact strength improver, the E component core-shell-type styrene-based polymer flame retardant, the F component inorganic filler, and the G component polyfluoroolefin resin are mixed with various additives and, if desired, particular amounts of the B component aromatic polycarbonate resin and/or the C component acrylonitrile-styrene-based resin. In this step, these components are substantially evenly dispersed in a kneader such as a tumbler, a reblender, a mixer, an extruder, or a co-kneader. Then the resulting mixture is molded into a predetermined shape (e.g., any of casings and components of various products such as home electric appliances, automobiles, information apparatuses, office equipment, telephones, stationeries, furniture, fibers, etc.) by an adequate molding method such as injection molding, injection compression molding, extrusion molding, blow molding, vacuum molding, press molding, foam molding, or supercritical molding. As a result, a molded product composed of the resin composition described above is made.

As described above, the flame retardant polycarbonate resin composition at least contains 5 to 85 percent by weight of the aromatic polycarbonate resin (A component) having a weight-average molecular weight (polystyrene equivalent) of 27000 to 35000, 0.2 to 10 percent by weight of the impact strength improver (D component), 0.05 to 4 percent by weight of the core-shell-type styrene-based polymer flame retardant (E component) having a sulfonate group bonded to the particle surface layer portion, 5 to 20 percent by weight of the inorganic filler (F component), and 0.1 to 0.5 percent by weight of the polyfluoroolefin resin (G component). The flame retardant polycarbonate resin composition thus exhibits high flame retardancy, heat resistance, dynamic properties, solvent resistance, recyclability, and storage stability under high-temperature high-humidity environment despite the small thickness. Since discarded optical disks can be used as the aromatic polycarbonate resin to be contained in the flame retardant polycarbonate resin composition, the discarded optical disk can be effectively used as the raw material and the recyclability is improved.

When the flame retardant polycarbonate resin composition further contains 30 to 84 percent by weight of the aromatic polycarbonate resin (B component) having a weight-average molecular weight (polystyrene equivalent) of 40000 to 60000, dynamic properties such as impact strength and tensile yield strength can be improved even when the molded product is thin. When the flame retardant polycarbonate resin composition further contains 5 to 15 percent by weight of the acrylonitrile-styrene-based resin (C component) having a weight-average molecular weight (polystyrene equivalent) 90000 to 140000, the oil resistance, solvent resistance, and flowability can be improved.

EXAMPLES

The flame retardant polycarbonate resin composition according to one embodiment will now be described by using specific examples. The present invention is not limited to the examples described below. Samples of various flame retardant polycarbonate resin compositions were prepared by using materials described below. The flame retardancy, impact strength, and moldability of the samples were evaluated. Note that the unit of the content is parts by weight.

First, A to G components used in Examples and Comparative Examples are described.

A Component

A-1: commercially available low-molecular-weight PC resin (L-1225LL: product of Teijin Chemicals Ltd., polystyrene (PS) Mw: 33319)

A-2: used compact disks pulverized (2 to 20 mm) and treated with a hot alkaline aqueous solution to remove coating films (recording material layers, labels, adhesive layers, hardening layers, metal reflective layers, etc.) (PS Mw: 29717)

A-3: Waste DVDs with coating films discarded from plants (PS Mw: 33237)

B Component

B-1: commercially available PC resin (L-1225L: product of Teijin Chemicals Ltd., polystyrene (PS) Mw: 43000)

B-2: PC resin recycled from used water bottles (PS Mw: 56000)

C Component

C-1: common AS resin (PS Mw: 127000, MFR: 3.2 g/10 min)

C-2: low-molecular-weight AS resin (PS Mw: 61000, MFR: 15 g/10 min)

C-3: AS resin recycled from professional-use cassette reels (PS Mw: 99000, MFR: 4.9 g/10 min)

D Component

D-1: commercially available SEBS (Tuftec M-1943: product of Asahi Kasei Chemicals Corporation)

D-2: commercially available ABS (Toyolac 500: product of Toray Industries, Inc.)

E Component

E-1: A styrene-acrylonitrile copolymer with a potassium sulfonate introduced into the surface layer portion: PASS-K (S content: 1.22 percent by weight, region occupied by the sulfonate group on the particle surface layer portion: 7.6%) was used as the flame retardant.

The method for making the flame retardant is as follows.

A styrene-acrylonitrile copolymer (styrene/acrylonitrile=75 wt %/25 wt %, PS Mw: 102000) was frost-shattered with liquid nitrogen and passed through an 80 mesh screen to obtain powder. To a round-bottomed flask, 50 g of the powder was charged. The round bottomed flask was attached to a rotary evaporator and rotated under heating at 60° C. During this step, the polystyrene resin powder entered a flowing state in the flask by the rotation of the evaporator.

Next, the flask is deaerated with a vacuum pump (pressure was reduced to about 0.01 MPa) and sealed.

Then a valve was operated to feed $SO_3$ gas from a $SO_3$ tank (charged with 2.5 g of $SO_3$) preheated to 60° C. into the deaerated flask. During this step, as the $SO_3$ gas was fed, the pressure in the flask increased to 0.02 MPa. Reaction was conducted in this state at 60° C. for 4 hours, and then the $SO_3$ gas in the flask was replaced by nitrogen. An aqueous potassium hydroxide solution was introduced into the flask to neutralize (adjust pH to 7) the sulfonated product, and the sulfonated product was filtered with a glass filter. The residue was washed with water, filtered again, and dried with a circulating air dryer (100° C.) to obtain 56 g of white powder. The sulfur content of the powder was analyzed and found to be 1.22 percent by weight. TOF-SIMS analysis confirmed that the thickness of the layer into which the potassium sulfonate was introduced was 7.6% of the diameter of the particles of the flame retardant for resin.

E-2: Polystyrene with potassium sulfonate introduced into the surface layer portion: PASS-K (S content: 1.41 percent by weight, region occupied by the sulfonate group on the particle surface layer portion: 8.1%) was used as the flame retardant. This flame retardant was produced by the same method as E-1 flame retardant except that a polystyrene (PS Mw: 282000) was used as the starting material.

E-3: A commercially available sodium polystyrene sulfonate (weight-average molecular weight: 70000, sulfur content: 15.3 percent by weight) was used as a comparative flame retardant. TOF-SIMS analysis confirmed that the thickness of the layer into which the sodium sulfonate was introduced was 100% (entirety) of the diameter of the particles of the flame retardant for resin.

E-4: Reaction was conducted in the same manner as with E-1 except that the amount of $SO_3$ gas charged was changed to 1.0 g. The resultant white powder weighed 53 g and had a sulfur content of 0.5 percent by weight (region occupied by the sulfonate group on the particle surface layer portion: 6%).

E-5: Reaction was conducted in the same manner as with E-1 except that the amount of $SO_3$ gas charged was changed to 12.5 g. The resultant white powder weighed 53 g and had a sulfur content of 3.5 percent by weight (region occupied by the sulfonate group on the particle surface layer portion: 9.9%).

F Component

F-1: A commercially available talc of ultrafine particle grade (median diameter: 3.8 μm, specific surface: 45,000 or more) (product of Fuji Talc Industrial Co., Ltd: LMS-400) was used.

F-2: glass fiber (CSF3PE-455: product of Nitto Boseki Co., Ltd., fiber length: 3 mm)

G Component

G-1: A commercially available PTFE (CD076 produced by Asahi-ICI Fluoropolymers Co., Ltd.) was used as the polytetrafluoroethylene having a fibril-forming property.

Other Components

X-40-9805 (produced by Shin-Etsu Chemical Co., Ltd.), i.e., a methyl phenyl-based solid silicon resin was used as a silicon-based flame retardant (used in Examples 2, 3, 7, 9, 10, 11, and 12 and Comparative Examples 6, 7, 8, and 9).

A commercially available flame-retardant ABS/PC alloy (1.6 mm in thickness: V-0 (containing a phosphate-based flame retardant, inorganic filler content: 10%) was used as a comparative sample in Comparative Example 12.

Examples 1 to 10 and Comparative Examples 1 to 8 Various additives described above were blended at blending ratios set forth in Tables 1 and 2 in a tumbler. Each sample was pelletized by melt-kneading in a co-rotating twin screw extruder (ZEOA produced by Berstorff). The extrusion conditions were 15 kg/h throughput and 150 rpm screw rotation. The extrusion temperature was 275° C. from the first feed port to the die portion.

The resultant pellets were dried in a circulating air dryer at 120° C. for 8 hours. Then the dried pellets were molded with an injection molding machine at a cylinder temperature of 290° C. and a die temperature of 70° C. into a test piece for measuring flame retardancy, a test piece for measuring heat resistance (deflection temperature under load), a test piece for measuring Izod impact strength, a test piece for measuring flexural modulus, a test piece (plate) for testing solvent resistance, and a palm rest (thickness: 1.0 mm) for laptop computers for confirming the possibility of making a thin molded product.

TABLE 1

| | | | Unit | Ex. 1 | Ex. 2 | Ex. 3 | Ex. 4 | Ex. 5 | Ex. 6 |
|---|---|---|---|---|---|---|---|---|---|
| Compositions | A component | A-1 | Parts by weight | 39 | | 19 | | | 5 |
| | | A-2 | | | 40 | | 30 | 10.9 | |
| | | A-3 | | | | 20.8 | 19.6 | | |
| | B component | B-1 | | 40 | 39.5 | 40 | | 57 | 62.6 |
| | | B-2 | | | | | 30 | | |
| | C component | C-1 | | 6.5 | 6.5 | 6.5 | 6.5 | | 15 |
| | | C-2 | | | | | | | |
| | | C-3 | | | | | | 6.5 | |
| | D component | D-1 | | 1 | 1 | 1 | 1 | 1.5 | 1 |
| | | D-2 | | | | | | | |
| | E component | E-1 | | 1 | | 0.2 | 0.5 | 4 | 1 |
| | | E-2 | | | | | | | |
| | | E-3 | | | | | | | |
| | | E-4 | | | 1 | | | | |
| | | E-5 | | | | | | | |
| | F component | F-1 | | 12 | 12 | 12 | 12 | 20 | 15 |
| | | F-2 | | | | | | | |
| | G component | G-1 | | 0.5 | 0.4 | 0.4 | 0.4 | 0.1 | 0.4 |
| | Silicon flame retardant | | | | 0.1 | 0.1 | | | |
| | | Total | | 100 | 100.5 | 100 | 100 | 100 | 100 |
| Properties | Flame retardancy | 1.0 mmt | — | V-1 | V-0 | V-1 | V-1 | V-1 | V-1 |
| | | 1.6 mmt | — | V-0 | V-0 | V-0 | V-0 | V-1 | V-0 |
| | Heat resistance | Deflection temperature under load | ° C. | 133 | 133 | 133 | 134 | 139 | 136 |
| | Impact strength | Izod impact strength | kgf · cm/cm² | 7.3 | 5 | 7 | 7.8 | 4.5 | 4 |
| | Rigidity | Flexural modulus | Kgf/cm² | 33000 | 34500 | 33000 | 34000 | 38000 | 39500 |
| | Moldability | Appearance (thin molded product) | — | Good | Good | Good | Good | Good | Good |

TABLE 1-continued

|  |  |  | Unit | | | | | | |
|---|---|---|---|---|---|---|---|---|---|
|  | Solvent resistance | Caster oil and alcohol | — | Good | Good | Good | Good | Good | Good |
|  | High-temperature high-humidity storage stability | 85° C. × 80% | — | Good | Good | Good | Good | Good | Good |
|  | Recyclability | Heat cycle × 5 | — | Good | Good | Good | Good | Good | Good |

|  |  |  | Unit | Ex. 7 | Ex. 8 | Ex. 9 | Ex. 10 | Ex. 11 | Ex. 12 |
|---|---|---|---|---|---|---|---|---|---|
| Compositions | A component | A-1 | Parts by weight |  |  |  |  | 37.5 |  |
|  |  | A-2 |  | 40 | 85 |  | 40 |  | 10 |
|  |  | A-3 |  |  |  | 85 |  |  |  |
|  | B component | B-1 |  | 39 |  |  | 41 | 41 | 84.25 |
|  |  | B-2 |  |  |  |  |  |  |  |
|  | C component | C-1 |  | 5 |  |  |  |  |  |
|  |  | C-2 |  |  |  |  |  |  |  |
|  |  | C-3 |  |  |  |  |  |  |  |
|  | D component | D-1 |  | 2.5 | 1.6 | 1.5 |  |  | 0.2 |
|  |  | D-2 |  |  |  |  | 7.5 | 10 |  |
|  | E component | E-1 |  | 1 | 1 | 1 | 1 |  |  |
|  |  | E-2 |  |  |  |  |  | 1 |  |
|  |  | E-3 |  |  |  |  |  |  |  |
|  |  | E-4 |  |  |  |  |  |  |  |
|  |  | E-5 |  |  |  |  |  |  | 0.05 |
|  | F component | F-1 |  | 12 | 12 | 12 | 10 | 10 |  |
|  |  | F-2 |  |  |  |  |  |  | 5 |
|  | G component | G-1 |  | 0.4 | 0.4 | 0.4 | 0.4 | 0.4 | 0.4 |
|  | Silicon flame retardant |  |  | 0.1 |  | 0.1 | 0.1 | 0.1 | 0.1 |
|  |  | Total |  | 100 | 100 | 100 | 100 | 100 | 100 |
| Properties | Flame retardancy | 1.0 mmt | — | V-1 | V-0 | V-0 | V-1 | V-1 | V-1 |
|  |  | 1.6 mmt | — | V-0 | V-0 | V-0 | V-0 | V-0 | V-1 |
|  | Heat resistance | Deflection temperature under load | ° C. | 138 | 136 | 135 | 135 | 133 | 132 |
|  | Impact strength | Izod impact strength | kgf·cm/cm$^2$ | 8.2 | 4.1 | 3.5 | 4.1 | 4 | 4 |
|  | Rigidity | Flexural modulus | Kgf/cm$^2$ | 29000 | 28000 | 27700 | 38000 | 37500 | 26500 |
|  | Moldability | Appearance (thin molded product) | — | Good | Good | Good | Good | Good | Good |
|  | Solvent resistance | Caster oil and alcohol | — | Good | Good | Good | Good | Good | Good |
|  | High-temperature high-humidity storage stability | 85° C. × 80% | — | Good | Good | Good | Good | Good | Good |
|  | Recyclability | Heat cycle × 5 | — | Good | Good | Good | Good | Good | Good |

TABLE 2

|  |  |  | Unit | CE. 1 | CE. 2 | CE. 3 | CE. 4 | CE. 5 | CE. 6 | CE. 7 |
|---|---|---|---|---|---|---|---|---|---|---|
| Compositions | A component | A-1 | Parts by weight | 40 |  |  | 39 |  | 87.5 |  |
|  |  | A-2 |  |  | 40 |  |  | 32 |  | 37 |
|  |  | A-3 |  |  |  |  |  |  |  |  |
|  | B component | B-1 |  | 40 | 39.5 |  | 40 | 31.5 |  | 36.5 |
|  |  | B-2 |  |  |  | 79 |  |  |  |  |
|  | C component | C-1 |  | 6.5 | 6.5 | 6.5 |  | 22 | 10 |  |
|  |  | C-2 |  |  |  |  | 6.5 |  |  |  |
|  |  | C-3 |  |  |  |  |  |  |  |  |
|  | D component | D-1 |  | 1 | 1 | 1 | 1 | 1 | 1 |  |
|  |  | D-2 |  |  |  |  |  |  |  | 15 |
|  | E component | E-1 |  |  |  | 1 | 1 | 1 | 1 | 1 |
|  |  | E-2 |  |  |  |  |  |  |  |  |
|  |  | E-3 |  |  |  |  |  |  |  |  |
|  |  | E-4 |  |  |  | 1 |  |  |  |  |
|  |  | E-5 |  |  |  |  |  |  |  |  |
|  | F component | F-1 |  | 12 | 12 | 12 | 12 | 12 | 12 | 10 |
|  |  | F-2 |  |  |  |  |  |  |  |  |
|  | G component | G-1 |  | 0.5 |  | 0.5 | 0.5 | 0.5 | 0.4 | 0.4 |
|  | Silicon flame retardant |  |  |  |  |  |  |  | 0.1 | 0.1 |
|  |  | Total |  | 100 | 100 | 100 | 100 | 100 | 100 | 100 |
| Properties | Flame retardancy | 1.0 mmt | — | VNG | V-2 | V-1 | V-1 | VNG | VNG | VNG |
|  |  | 1.6 mmt | — | VNG | V-2 | V-0 | V-1 | VNG | VNG | VNG |
|  | Heat resistance | Deflection temperature under load | ° C. | 132 | 133 | 135 | 131 | 125 | 135 | 127 |

TABLE 2-continued

| | | | | | | | | | |
|---|---|---|---|---|---|---|---|---|---|
| Impact strength | Izod impact strength | kgf · cm/cm² | 7.1 | 7.4 | 7.5 | 7 | 2 | 3.5 | 5.4 |
| Rigidity | Flexural modulus | Kgf/cm² | 32500 | 33000 | 34000 | 32000 | 33000 | 23000 | 39500 |
| Moldability | Appearance (thin molded product) | — | Good | Good | Poor | Good | Good | Good | Good |
| Solvent resistance | Caster oil and alcohol | — | Good | Good | Good | Poor | Poor | Good | Good |
| High-temperature high-humidity storage stability | 85° C. × 80% | — | Good | Good | Good | Good | Good | Good | Good |
| Recyclability | Heat cycle × 5 | | Good | Good | Good | Good | Good | Good | Good |

| | | | Unit | CE. 8 | CE. 9 | CE. 10 | CE. 11 | CE. 12 |
|---|---|---|---|---|---|---|---|---|
| Compositions | A component | A-1 | Parts by weight | | 87.5 | | | Commercially available flame retardant ABS/PC alloy |
| | | A-2 | | 39 | | 45.6 | 10.6 | |
| | | A-3 | | | | | | |
| | B component | B-1 | | 40 | | 41 | 56 | |
| | | B-2 | | | | | | |
| | C component | C-1 | | 6.5 | | | 6.5 | |
| | | C-2 | | | | | | |
| | | C-3 | | | | | | |
| | D component | D-1 | | 1 | 1 | | 1.5 | |
| | | D-2 | | | | | | |
| | E component | E-1 | | | 1 | 1 | | |
| | | E-2 | | | | | 5 | |
| | | E-3 | | 1 | | | | |
| | | E-4 | | | | | | |
| | | E-5 | | | | | | |
| | F component | F-1 | | 12 | 10 | 12 | 20 | |
| | | F-2 | | | | | | |
| | G component | G-1 | | 0.4 | 0.4 | 0.4 | 0.4 | |
| | Silicon flame retardant | | | 0.1 | 0.1 | | | |
| | Total | | | 100 | 100 | 100 | 100 | |
| Properties | Flame retardancy | 1.0 mmt | — | VNG | V-1 | V-0 | VNG | V-2 |
| | | 1.6 mmt | — | V-2 | V-1 | V-0 | V-2 | V-0 |
| | Heat resistance | Deflection temperature under load | ° C. | 132 | 134 | 136 | 136 | 88 |
| | Impact strength | Izod impact strength | kgf · cm/cm² | 6.9 | 1.9 | 1.4 | 4.3 | 2.9 |
| | Rigidity | Flexural modulus | Kgf/cm² | 32500 | 30200 | 31500 | 37500 | 32400 |
| | Moldability | Appearance (thin molded product) | — | Good | Fair | Good | Good | Good |
| | Solvent resistance | Caster oil and alcohol | — | Fair | Fair | Good | Good | Good |
| | High-temperature high-humidity storage stability | 85° C. × 80% | — | Fair | Good | Good | Good | Poor |
| | Recyclability | Heat cycle × 5 | | Good | Good | Good | Good | Poor |

In the tables, Ex denotes Example and CE denotes Comparative Example.

The flame retardancy was evaluated by UL94 vertical flame test at thicknesses of 1.0 mm and 1.6 mm and graded. In the table, VNG indicates that the sample did not satisfy any of V-0, V-1, and V-2.

The heat resistance of a test piece prepared by injection molding was evaluated by measuring the deflection temperature under load according to ASTM D648 (A method) under a measurement condition of 4.6 kgf/cm².

The Izod impact strength was evaluated by measuring the Izod impact strength (with notch) according to Japanese Industrial Standard (JIS) K7110.

The rigidity (flexural modulus) was evaluated by measuring the flexural modulus according to ASTM A790.

The moldability was evaluated as follows. First, a molded product was formed by using a mold for a palm rest (1.0 mm in thickness) for laptop computers. The appearance (conditions of sink marks and weld lines) of the product was checked, and the strength of the welded portions and the strength of the boss portions created by ten times of repeated screwing were evaluated to check whether the product was at a practical level.

The evaluation of the solvent resistance was conducted as follows. A test plate was prepared and the solvent resistance was confirmed from the appearance in regard to oil resistance (castor oil: 40° C.×95%×24 hr) and alcohol resistance (ethanol: normal temperature, 65° C.×95%×24 hr).

The storage stability under high temperature and high humidity was evaluated by storing the resin pellets in a thermo-hygrostat at 85° C.×80 Rh % for one month and determining the change in molecular weight of the polycarbonate resin portions before and after storage by GPC (polystyrene equivalent). The long-term storage stability was determined on the basis of whether a molecular weight equal to 90% or more of the molecular weight before storage was observed after one month of storage.

The recyclability was evaluated as follows. Of the flame retardant polycarbonate resin composition samples, those which exhibited an Izod impact strength 2.5 Kgf·cm/cm² or more after five times of repeated melt-kneading and retained the initial flame retardancy were evaluated as "good".

As evident from Examples 1 to 10 shown in Table 1, the flame retardant polycarbonate resin compositions of Examples 1 to 10 can be used to form thin molded products. Compared to the existing flame retardant polycarbonate resin compositions (containing phosphate-based flame retardants), the compositions of Examples 1 to 10 have higher flame retardancy, heat resistance, storage stability, and recyclability.

In particular, the results shown in Table 2 indicate that Comparative Example 1 not containing the core-shell styrene-based polymer flame retardant (PASS-K) is rated VNG for the flame retardancy. This is lower than the rating given to Example 1 among Examples. Comparative Example 1 did not achieve flame retardancy.

Comparative Example 2 not containing a drip-preventing agent (PTFE) underwent dripping during burning and was rated V-2 for the flame retardancy. This rating was lower than that of, for example, Example 1 among Examples. Comparative Example 2 thus did not achieve sufficient flame retardancy.

Comparative Example 3 did not contain the A component aromatic polycarbonate having a low molecular weight. Thus, the flowability was low and the moldability was poor (NG), resulting in short shot.

Comparative Example 4 exhibited low solvent resistance since an AS resin (C-2) having a low molecular weight was used.

Comparative Example 5 contained more than 15 percent by weight of the AS resin. Although the moldability (flowability) was improved, the flame retardancy, impact strength, and solvent resistance were significantly degraded.

Comparative Example 6 did not contain an organic filler (F component). Thus the flame retardancy and flexural modulus were significantly degraded.

Comparative Example 7 exhibited an improved Izod value due to its high impact strength improver (D component) content. However, compared to, for example, Example 10 among Examples, the flame retardancy of Comparative Example 7 was significantly low.

Comparative Example 8 contained sodium polystyrene sulfonate as the flame retardant instead of the core-shell styrene-based polymer flame retardant having a sulfonate group bonded to the particle surface layer portion. Thus, the flame retardancy was significantly degraded and the solvent resistance was slightly degraded compared to, for example, Example 2 among Examples. Comparative Example 8 exhibited roughness in the resin surface after 1 month of storage under high-temperature and high-humidity.

Comparative Example 9 contained more than 85 percent by weight of the A component aromatic polycarbonate resin. Thus, the impact strength, moldability, and solvent resistance were low.

Comparative Example 10 did not contain the impact strength improver (D component). Thus, the impact strength was significantly low.

Comparative Example 11 contained more than 5 percent by weight of the core-shell styrene-based polymer flame retardant (E component) having a sulfonate group bonded to the particle surface layer portion. Since the E component content was excessively large, the flame retardancy was low.

In Comparative Example 12 containing a commercially available flame retardant ABS/PC alloy (containing a phosphorus-based flame retardant), the molecular weight of PC after a month of storage under high temperature and high humidity decreased to 70% of the initial molecular weight or less. Comparative Example 12 also exhibited an Izod impact value of less than 2.5 Kgf·cm/cm$^2$ after five times of repeated melt-kneading and flame retardancy lower than the initial level.

In contrast to these Comparative Examples, all of Examples 1 to 12 were rated Good for every item. As shown by Examples 8 and 9, blending at least particular amounts of the A component aromatic polycarbonate resin, the D component impact strength improver, the E component core-shell styrene-based polymer flame retardant having a sulfonate group bonded to the particle surface layer portion, the F component inorganic filler, and the G component polyfluoroolefin resin will improve flame retardancy, heat resistance, dynamic properties, solvent resistance, recyclability, and storage stability under high temperature and high humidity despite the small thickness.

Of Examples 1 to 12, Examples 10 to 12 containing the B component aromatic polycarbonate resin exhibited improved dynamic properties compared to Examples 8 and 9.

Compared to Examples 8 to 12, Examples 1 to 7 containing the B component aromatic polycarbonate resin and the C component acrylonitrile-styrene-based resin exhibited improved oil resistance and solvent resistance without lowering the impact strength and rigidity. The flowability during melting of the flame retardant polycarbonate resin composition was also satisfactory.

In view of the above, a flame retardant aromatic polycarbonate resin composition for forming thin molded products that contains particular amounts of an aromatic polycarbonate resin (A component) having a weight-average molecular weight (polystyrene equivalent) of 27000 to 35000, an impact strength improver (D component), a core-shell-type styrene-based polymer flame retardant CE component) having a sulfonate group bonded to the particle surface layer portion, an inorganic filler (F component), and a polyfluoroolefin resin (G component) will exhibit high flowability during molding, thereby allowing fabrication of thin molded products, and excellent flame retardancy, solvent resistance, and high-temperature high-humidity storage stability without decreasing the dynamic properties such as impact strength or the like. Furthermore, recyclability can also be achieved.

Thus, the flame retardant polycarbonate resin composition having the above-described features has excellent flame retardancy, heat resistance, rigidity, storage stability, and recyclability and is useful in various applications including a variety of electronic and electric appliances, OA equipment, automobile parts, mechanical parts, farming materials, shipping containers, toys, and other general goods.

The present application contains subject matter related to that disclosed in Japanese Priority Patent Application JP 2008-152072 filed in the Japan Patent office on Jun. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A flame retardant polycarbonate resin composition comprising:
    5 to 85 percent by weight of a first aromatic polycarbonate resin having a weight-average molecular weight (polystyrene equivalent) of 27,000 to 35,000;
    0.2 to 10 percent by weight of an impact strength improver;
    0.05 to 4 percent by weight of a core-shell-type styrene-based polymer flame retardant having a particle-shaped inner core portion having a diameter and a particle surface layer portion disposed outside the particle-shaped inner core portion and not disposed inside the particle-shaped inner core portion, wherein a sulfonate group is bonded to the particle surface layer portion, wherein the core-shell-type styrene-based polymer flame retardant contains 0.5 to 3.5 percent by weight of the sulfonate group, on a sulfur basis, bonded to a styrene-based polymer having the weight-average molecular weight (polystyrene equivalent) of 90,000 to 300,000;

5 to 20 percent by weight of an inorganic filler; and 0.1 to 0.5 percent by weight of a polyfluoroolefin resin.

2. The flame retardant polycarbonate resin composition according to claim 1, further comprising 30 to 84 percent by weight of a second aromatic polycarbonate resin having the weight-average molecular weight (polystyrene equivalent) of 40,000 to 60,000.

3. The flame retardant polycarbonate resin composition according to claim 2, further comprising 5 to 15 percent by weight of an acrylonitrile-styrene-based resin having the weight-average molecular weight (polystyrene equivalent) of 90,000 to 140,000.

4. The flame retardant polycarbonate resin composition according to claim 1, wherein the core-shell-type styrene-based polymer flame retardant contains a copolymer of styrene and a monomer other than styrene, and the sulfonate group bonded to the copolymer.

5. The flame retardant polycarbonate resin composition according to claim 1, wherein the first aromatic polycarbonate resin having the weight-average molecular weight (polystyrene equivalent) of 27,000 to 35,000 is an aromatic polycarbonate resin for making optical substrates.

6. The flame retardant polycarbonate resin composition according to claim 1, wherein the first or second aromatic polycarbonate resin comprises recycled material.

7. The flame retardant polycarbonate resin composition according to claim 1, comprising 10 to 40 percent by weight of the first aromatic polycarbonate resin.

8. The flame retardant polycarbonate resin composition according to claim 1, comprising 30 to 63 percent by weight of the second aromatic polycarbonate resin.

9. The flame retardant polycarbonate resin composition according to claim 3, wherein the acrylonitrile-styrene-based resin comprises a melt flow rate at 200 C and 5 kg of less than 15.

10. The flame retardant polycarbonate resin composition according to claim 3, wherein the acrylonitrile-styrene-based resin comprises an acrylonitrile content of 15 to 50 percent by weight.

11. The flame retardant polycarbonate resin composition according to claim 1, wherein the impact strength improver comprises a rubberlike elastic material.

12. The flame retardant polycarbonate resin composition according to claim 1, comprising 0.5 to 7.5 percent by weight of the impact strength improver.

13. The flame retardant polycarbonate resin composition according to claim 1, wherein the core-shell-type styrene-based polymer flame retardant includes a monomer other than styrene comprising at least one of acrylonitrile, a-methylstyrene, butadiene, isoprene, pentadiene, cyclopentadiene, ethylene, propylene, butene, isobutylene, vinyl chloride, vinyltoluene, vinylnaphthalene, acrylic acid, acrylic acid esters, methacrylic acid, methacrylic acid esters, maleic acid, fumaric acid, ethylene glycol, phthalic anhydride, or N-phenylmaleimide.

14. The flame retardant polycarbonate resin composition according to claim 1, wherein the monomer other than styrene comprises 0 to 60 percent weight of the core-shell-type styrene-based polymer flame retardant.

15. The flame retardant polycarbonate resin composition according to claim 1, wherein the particle surface layer portion has a thickness of half or less than the diameter of the particle-shaped inner core portion.

16. The flame retardant polycarbonate resin composition according to claim 1, comprising 0.2 to 1 percent by weight of the core-shell-type styrene-based polymer flame retardant.

17. The flame retardant polycarbonate resin composition according to claim 1, wherein the diameter of the core-shell-type styrene-based polymer flame retardant is 250 microns or less.

* * * * *